United States Patent [19]
Kuwabara

[11] Patent Number: 6,129,334
[45] Date of Patent: Oct. 10, 2000

[54] PIPE COUPLING SOCKET

[75] Inventor: Tetsuya Kuwabara, Tokyo, Japan

[73] Assignee: Nitto Kohki Co., Ltd., Japan

[21] Appl. No.: 09/219,604

[22] Filed: Dec. 23, 1998

[30] Foreign Application Priority Data

Dec. 26, 1997 [JP] Japan ................................... 9-360583

[51] Int. Cl.[7] ............................................ F16K 51/00
[52] U.S. Cl. .................................. 251/149.6; 251/149.1; 285/315; 285/316
[58] Field of Search ............................. 251/149.6, 149.1; 285/315, 316

[56] References Cited

U.S. PATENT DOCUMENTS

| 3,964,771 | 6/1976 | Baudouin | 285/315 |
| 4,703,958 | 11/1987 | Fremy | 285/316 |
| 4,988,129 | 1/1991 | Saito | 285/328 |
| 5,607,139 | 3/1997 | Kjellberg | 251/149.6 |

FOREIGN PATENT DOCUMENTS

| 51-69119 | of 0000 | Japan . |
| 47-23700 | 7/1972 | Japan . |
| 60-30548 | 9/1985 | Japan . |
| 38-18429 | 9/1993 | Japan . |
| 7-293772 | 11/1995 | Japan . |
| 2630584 | 4/1997 | Japan . |

*Primary Examiner*—Gregory L. Huson
*Assistant Examiner*—John P. Welsh
*Attorney, Agent, or Firm*—Fulbright & Jaworski L.L.P.

[57] ABSTRACT

The present invention provides a pipe coupling socket having a main body containing a plurality of lock balls for locking a plug accepted in the main body. The main body has a projecting lock portion which projects from the outer circumferential surface and has a top surface in which a groove is formed. The operation sleeve has a stepped portion formed in the circumferential direction on the inner surface thereof, such as to engage with an axial end of the projecting lock portion, thus inhibiting the operation sleeve from transferring to the rear end portion side, a lock releasing recess recessed in the stepped portion such as to house an axial end of the projecting lock portion, thus allowing the operation sleeve to transfer to the rear end portion side, and protruding portions which can be fitted to the groove when the projecting lock portions are placed at a position which matches the lock releasing recess in the axial direction, and at a position which is offset from the lock releasing recess in the circumferential direction. The projecting lock portion can go over the protruding portions when the user moves the operation sleeve in the circumferential direction.

9 Claims, 6 Drawing Sheets

PIPE COUPLING SOCKET

BACKGROUND OF THE INVENTION

The present invention relates to a pipe coupling socket for connecting a socket and a plug detachably to each other by operating the operating sleeve, with a locking member equipped in the socket.

A great number of pipe couplings, each of which consists of a socket having a locking member which is pushed in or released by the operating sleeve, and a plug having a stopper groove used for stopping or releasing the locking member, are manufactured and widely used. Conventionally, pipe couplings of the above-described type have a structure in which the operation sleeve proceeds to press the locking member and it moves backwards to release the member. Of the pipe couplings having the above-described structure, there are a number of types having operation sleeve lock means for preventing the operation sleeve from moving backwards undesirably while the socket and plug are in the connection state.

As an example of the conventional pipe coupling having such operation sleeve lock means, the type having a structure in which a separate lock member is fitted together with the operation sleeve around the circumference of the main body of the socket, is known (Japanese Patent No. 2630584).

However, such a pipe coupling having a separated lock member involves a more number of parts by the lock member, and the number of steps for the assembling is increased, thus raising the production cost. Further, in terms of the operation, both of the operation sleeve and the lock member must be operated, and therefore the connection and separating operations for the socket and plug become more laborious than usual.

BRIEF SUMMARY OF THE INVENTION

The main object of the present invention is to provide a pipe coupling socket capable of surely locking a male member with a simple structure involving a small number of parts.

The pipe coupling socket of the present invention has a hollow cylindrical socket having a front end portion capable of receiving a male member in which a circumferential groove is formed in its outer circumferential portion, and a rear end portion to which a pipe member to be connected to the male member, can be fixed. In the front end portion of the main body of the socket, a plurality of radial holes are formed in the circumferential direction at equal intervals, such that each hole has such a shape that the inner circumferential diameter reduces towards the center of the front end portion. In each of these radial holes, a locking member is received to be movable, and as each lock member moves inwards in the radial direction, the lock member is engaged in the groove formed on the outer circumferential surface of the male member, thereby stopping the movement of the male member in the axial direction. Further, the operation sleeve is mounted to be slidable, onto the front end portion of the main body of the socket. The operation sleeve serves to stop the lock member to move outwards in the radial direction when the sleeve moves to the front end side, whereas the sleeve makes the movement of the lock member possible when it moves to the rear end side. The socket includes a projecting lock portion which has a predetermined width and a length in the axial direction, and a top surface having a groove formed therein, and projects from one side of the outer circumferential surface of the main body of the socket and the inner circumferential surface of the operation sleeve, a step portion formed in the circumferential direction on the other side of the outer circumferential surface of the main body of the socket and the inner circumferential surface of the operation sleeve, such as to engage with an axial directional end of the projecting lock portion, thus inhibiting the operation sleeve from transferring to the rear end portion side, a lock releasing recess recessed in the step portion such as to house an axial directional end of the projecting lock portion, thus allowing the operation sleeve to transfer to the rear end portion side, and protruding portions each to be fitted to the groove to prevent the operation sleeve from transferring in the circumferential direction, when the projecting lock portion is placed at a position which matches the lock releasing recess in the axial direction, and at a position which is offset from the lock releasing recess in the circumferential direction. The projecting lock portion can go over the protruding portion when the user moves the operation sleeve in the circumferential direction.

With regard to the pipe coupling socket, when the operation sleeve is located on the front end portion of the main body of the socket, the lock member is inhibited from transferring outwards in the radial direction, and thus the male member is locked while it is housed in the main body of the socket. When the projecting lock portion formed on one side of the operation sleeve and the main body of the socket, is located at a position which is offset in the circumferential direction from the lock releasing recess in the step portion formed on the other side, the axial directional end of the projecting lock portion is engaged with the step portion. Thus, the operation sleeve cannot move to the rear end portion side with respect to the main body of the socket. As the operation sleeve is rotated, the projecting lock portion abuts to the protruding portion. However, if the user rotates the operation sleeve with a large force, the projecting lock portion goes over the protruding portion and the operation sleeve further rotates. Thus, the protruding portion fits in the groove formed in the top surface of the projecting lock portion, and therefore the operation sleeve can be maintained at the position where the projecting lock portion matches the lock releasing recess in the axial direction, and at the position where the projecting lock portion is offset from the lock releasing recess in the circumferential direction. When the projecting lock portion is placed at the position where it matches the lock releasing recess in the axial direction, the operation sleeve can be moved to the rear end portion side of the main body of the sockets. Thus, the lock member can move outwards in the radial direction in order to release the lock of the male portion.

As described above, the pipe coupling socket of the present invention does not require a separate part for stopping the movement of the operation sleeve, and therefore the invention can be operated with a simple structure and easy way, and further it can be manufactured at low cost.

In a preferable embodiment of the present invention, the main body of the socket has a small outer diameter portion, a middle outer diameter portion and a large outer diameter portion arranged in the order from the front end portion to the rear end portion, and the operation sleeve has a large inner diameter portion slidable on the large outer diameter portion and a small inner diameter portion movable on the middle outer diameter portion. Further, the projecting lock portion is formed on the outer circumferential surface of the middle outer diameter portion of the main body of the socket, and the lock releasing recess is formed in the small inner diameter portion of the operation sleeve.

It is particularly preferable that a pair of the projecting lock portion and the lock releasing recess are formed to face in the radial direction.

Further, another preferable embodiment of the present invention further includes a regulation step portion protruding in the axial direction from the step portion between the lock releasing recess and the protruding portion formed at a position which is offset in the circumferential direction from the lock releasing recess, and the regulation step portion can be engaged with one of the side edge portions of the projecting lock portion when the groove of the. projecting lock portion fits with any one of the protruding portions. In this case, it is preferable that a pair of the regulation step portions should be formed to face in the radial direction.

In a still another embodiment of the present invention, a display portion is provided for at least one of the main body of the socket and the operation sleeve such as to be visually recognizable from outside, and the display portion displays either one of the state in which the operation sleeve can move to the rear end portion side, and the state in which it cannot move. With this embodiment, the user can confirm the positions of the operation sleeve and the main body of the socket easily by naked eye, thus making it possible for the user to handle the device accurately and safely. In this case, it is preferable that the display portion should include a display formed on an outer surface of the main body of the socket at a position where it matches the groove in the axial direction, and another display formed on an outer surface of the operation sleeve at a position where it matches the protruding portion in the axial direction, to which the projecting lock portion fits at the position which is offset from the lock releasing recess in the circumferential direction.

Still another embodiment of the present invention includes a cover ring to be mounted to the front end portion of the main body of the socket, and the front end portion of the operation sleeve can be housed in the cover ring. The operation sleeve is protected by the cover ring, and further it is possible to prevent the entering of undesired materials between the operation sleeve and the main body of the socket.

It is preferable that the present invention further include an adapter which is coupled with a pipe member and can be fixed to the rear end portion of the main body of the socket, a valve seat held in the main body of the socket and a valve main body urged towards the valve seat.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
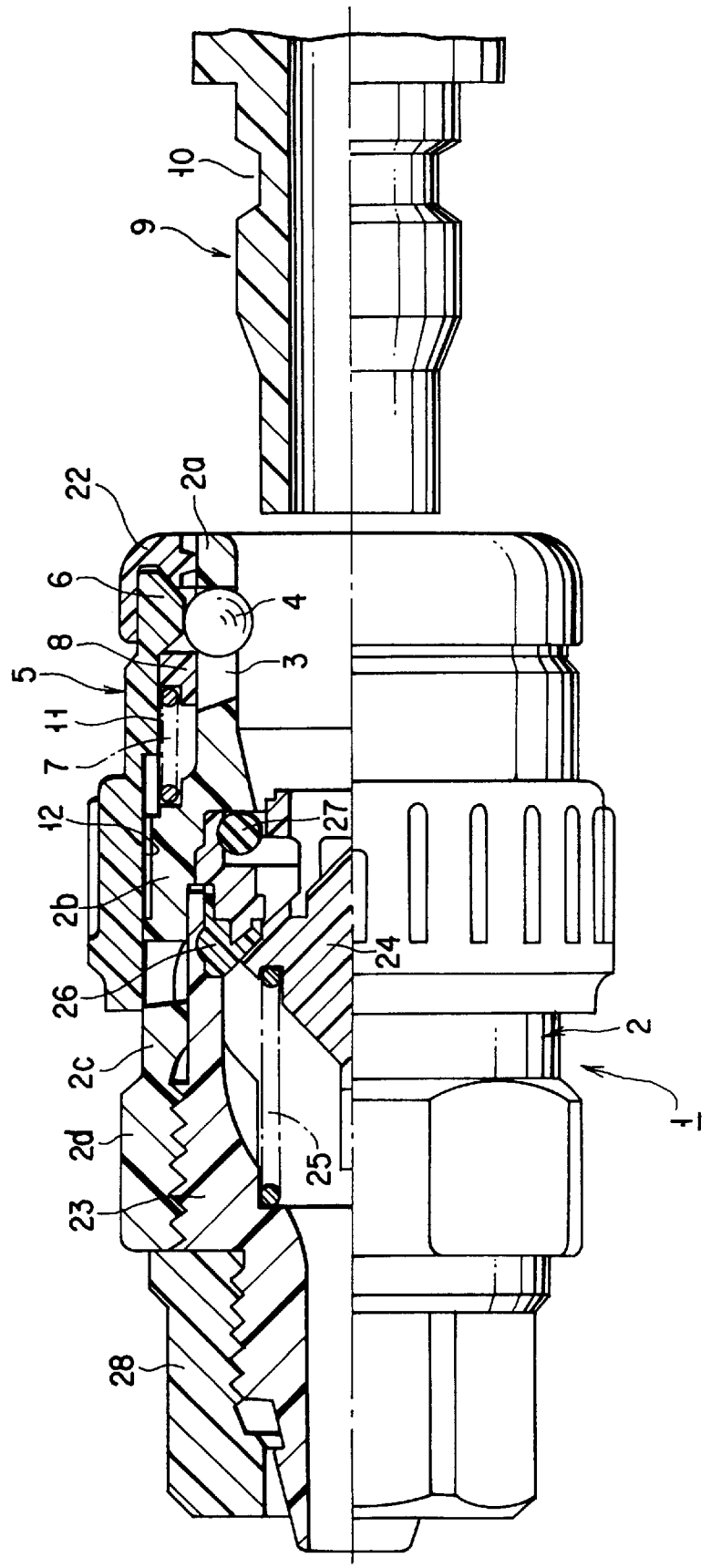
FIG. 1 is a lateral view showing a pipe coupling socket according an embodiment of to the present invention, an upper half of which illustrates a longitudinal section of the embodiment.
Figure 2:
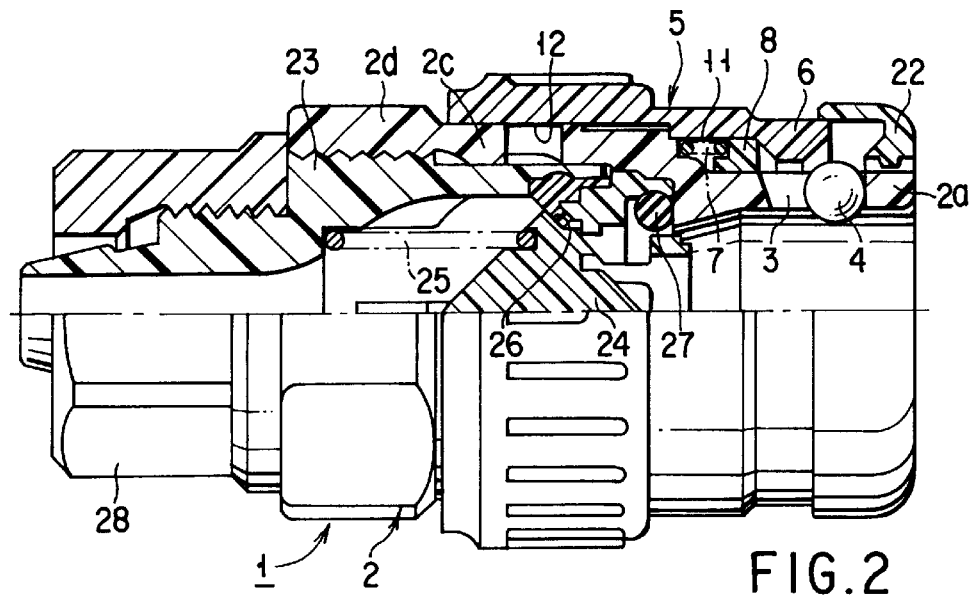
FIG. 2 is a lateral view illustrating the state in which the operation sleeve is moved back.
Figure 3:
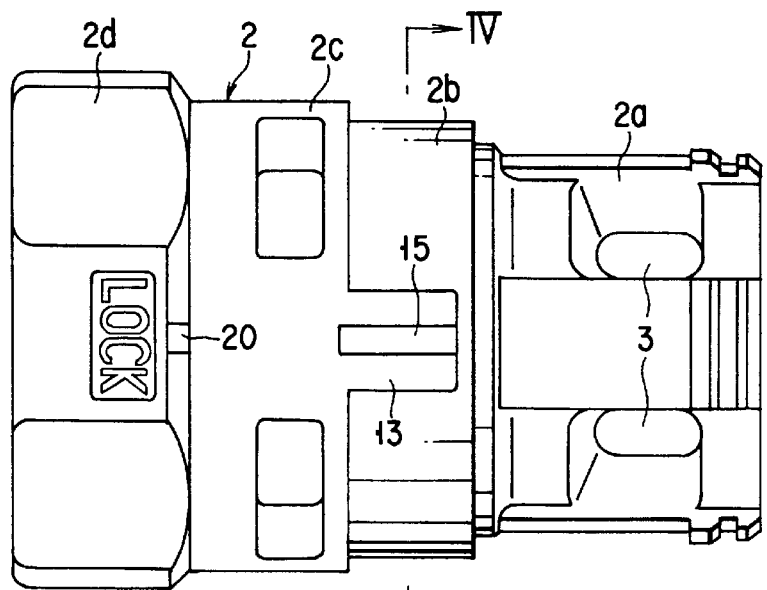
FIG. 3 is a plan view of the main body of this pipe coupling socket.
Figure 4:
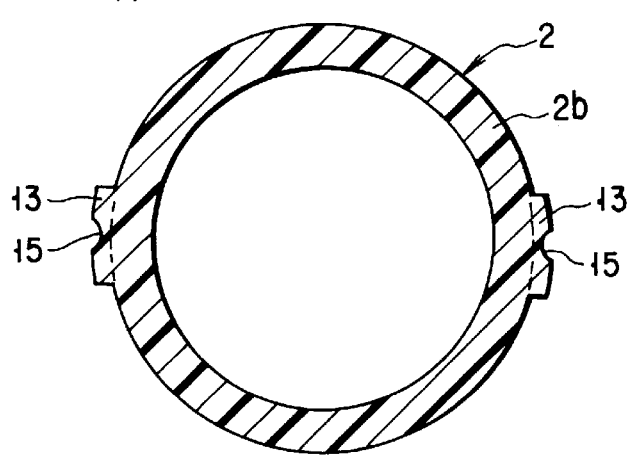
FIG. 4 is a cross sectional view taken along the line IV—IV of FIG. 3.
Figure 5:
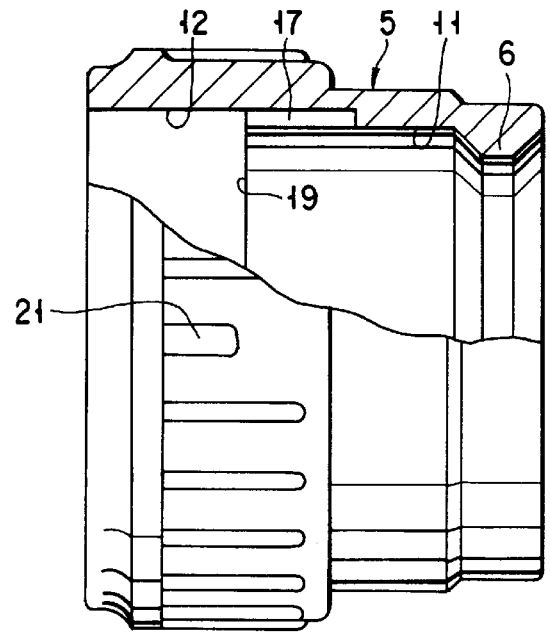
FIG. 5 is a partially broken-out lateral view of an operation sleeve used in this pipe coupling socket.
Figure 6:
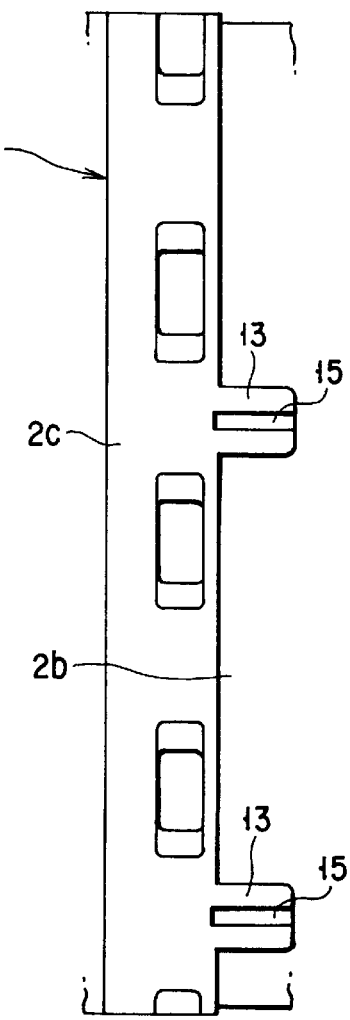
FIG. 6 is a development view of the outer surface of the main body of this pipe coupling socket;.
Figure 7:
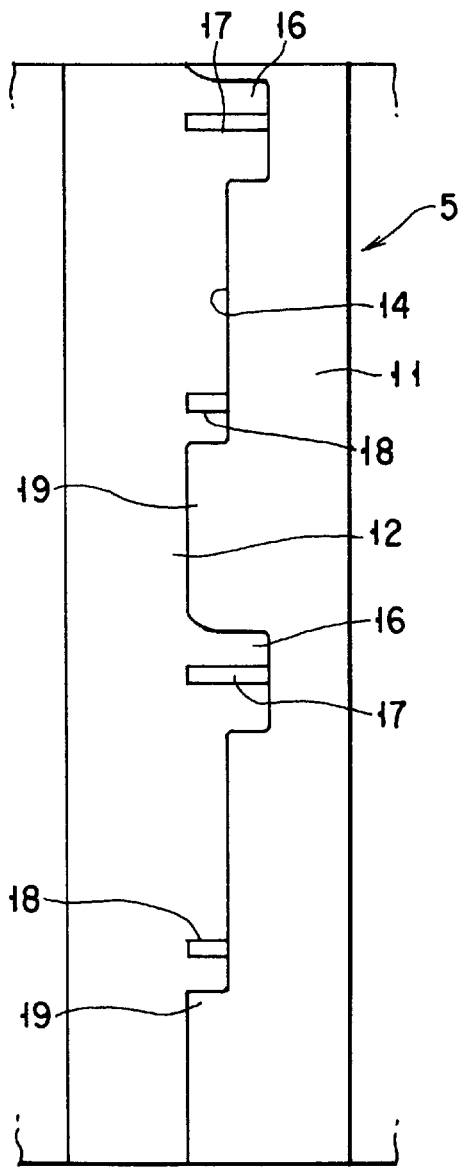
FIG. 7 is a development view of the inner surface of the operation sleeve used in this pipe coupling socket.
Figure 8:
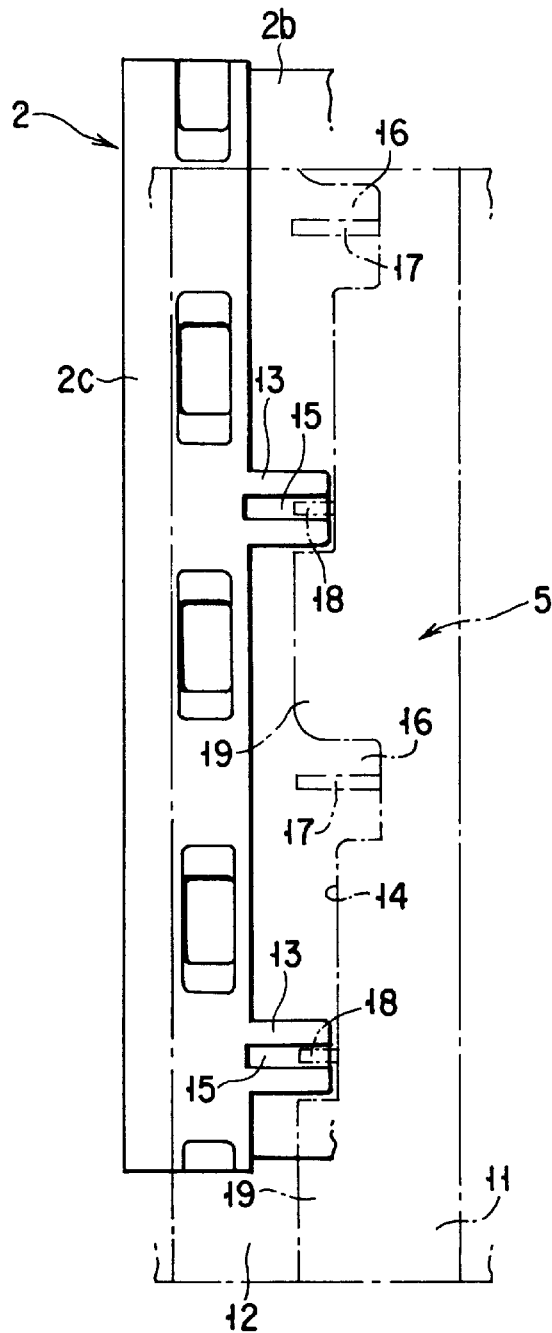
FIG. 8 is a developmental explanatory view showing the state of the maintenance of the lock between the main body and the operation sleeve of the pipe coupling socket.
Figure 9:
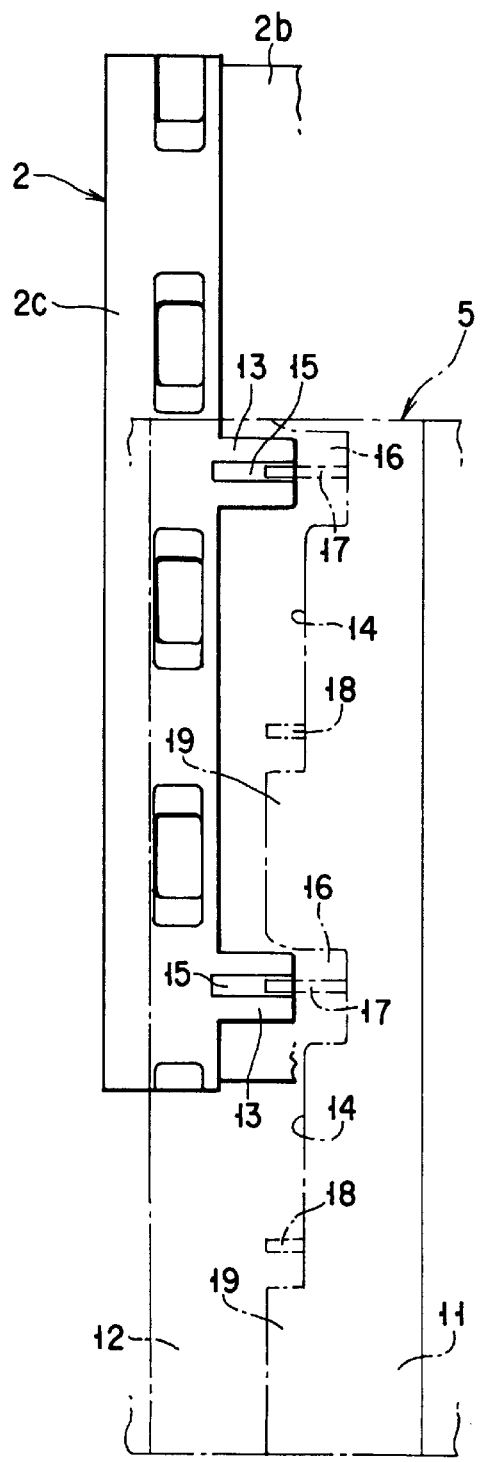
FIG. 9 is a development explanatory view of the main body and the operation sleeve of the pipe coupling socket, illustrating the state in which the operation sleeve can be set back.

FIGS. 1 to 7 show an embodiment of the pipe coupling socket according to the present invention.

A socket 1 has a main body 2 made of a synthetic resin and having a cylindrical shape, in which a lock member 4 for plug lock is loosely fit in a tapered long hole 3 made in a small outer diameter portion 2a of the front end side, along its axial direction. In this embodiment, lock balls are used as the lock members 4. There are a plurality of tapered long holes 3 arranged at equal intervals in the circumferential direction of the small outer diameter portion 2a. In the inner circumferential side of the small outer diameter portion 2a, the width of the hole in the cross sectional direction is set such that a part of the lock member 4 projects from the inner surface, and the width of the hole is made to form a tapered shape whose width increases towards the outer circumference of the small outer diameter portion 2a. The diameter of the lock member 4 is set slightly larger than the thickness of the small outer diameter portion 2a.

An operation sleeve 5 which is made of a synthetic resin and can move forward to press the lock members 4 in the centripetal direction, thereby moving the lock members 4 backward to be released, is fit on the outer circumference of the front end side of the main body 2, to be slidable and rotatable in the circumferential direction. On the inner circumference of the front end of the operation sleeve 5, a lock member pressing portion 6 which presses the lock members 4 in the centripetal direction, is provided to face inwards. A press ring 8 urged in the forwarding direction by a spring 7 is fitted between the operation sleeve 5 and the small outer diameter portion 2a of the main body 2, to be slidable in the axial direction. The press ring 8 abuts on the inner side of the lock member press portion 5 of the operation sleeve 5. The operation sleeve 5 is urged in the forward direction by the spring 7 via the press ring, such as to be placed in the forwarding position, thus pressing the lock member 4 in the centripetal direction at all times.

When a plug 9 is inserted to the socket in the above-described state, the lock members 4 are pressed by the step portion formed on the outer circumference of the plug 9, and the lock members 4 move backwards within the tapered long hole 3 while pushing the press ring 8 backwards against the elastic force of the spring 7. With the above-described operation, it becomes possible for the lock members 4 to escape to a space made as the press ring 8 is separated from the lock member press portion 6 of the operation sleeve 5. Thus, the step portion of the plug 9 goes over the lock members 4 and the plug 9 is further inserted until an engage groove 10 made in the outer circumference of the plug 9 reaches the lower section of the lock members 4. As being pushed by the press ring 8 moved backwards against the elastic force of the spring 7, the lock members 4 are engaged with the engage with the engage groove 10 and moves forwards in the tapered long holes 3. When the lock members 4 reach underneath the lock member press portion 6 of the operation sleeve 5, the member is placed in the state that it is pressed in the centripetal direction. Thus, the pipe coupling socket 1 and the plug 9 are connected to each other.

In order to separate the pipe coupling socket 9 and the plug 9 from each other, the operation sleeve 5 is moved backwards, and the lock members 4 which are being pressed in the centripetal direction is released.

In addition to the small diameter portion 2a, the main body 2 further has a middle outer diameter portion 2b and a large outer diameter portion 2c, whose diameter increases stepwise in the order, in the rear of the portion 2a. Meanwhile, in the operation sleeve 5 formed to fit the outer circumference of the main body 2, a small inner diameter hole 11 formed to fit the outer circumference of the middle outer diameter portion 2b of the main body 2 is provided at the front portion side of the sleeve, and a large inner diameter hole 12 formed to fit the outer circumference of the large outer diameter portion 2c of the main body 2 is provided at the rear portion side of the sleeve.

On the outer circumference of the middle outer diameter portion 2b of the main body 2, a projecting lock portion 13 having the same height as that of the large outer diameter portion 2c is provided to extend in the axial direction at a predetermined width. The front end of the projecting lock portion 13 abuts on the stepped portion 14 located on the large inner diameter portion side of the small inner diameter portion 11 of the operation sleeve 5, so as to stop the operation sleeve 5 from moving backwards from the forwarding position. In this embodiment, there are two projecting lock portions 13 arranged in the circumferential direction at equal intervals.

Further, in each of the projecting lock member 13, an engage recess 15 which is also referred as a groove is made to extend in the axial direction. Meanwhile, on the inner circumferential surface of the small inner diameter portion 11 of the operation sleeve 5, a look releasing recess 16 which allows the entering of the projecting lock portion 13 provided on the outer circumferential surface of the middle outer diameter portion 2b of the main body 2, and enables the operation sleeve 5 to move backwards, is provided to correspond to the projecting lock portion 13.

In the lock releasing recess 16, a protrusion 17 which is to engage with the engage recess 15 provided on the projecting lock portion 13 as it goes over the projecting lock portion 13, is extended in the axial direction, and the distal end of the protrusion protrudes from the stepped portion 14 on the large inner diameter portion side, towards the inner circumferential surface of the large inner diameter portion 12.

On the inner circumferential surface of the large inner diameter portion 12 of the operation sleeve 5, a protrusion 18 which is to engage with the engage recess 15 provided on the projecting lock portion 13 at a position where the projecting lock portion 13 cannot enter the lock releasing recess 16 as it goes over the projecting lock portion 13, is provided. Further, a rotation regulating stepped portion 19 is provided to be adjacent to the protrusion 19, designed to regulate the further rotation of the operation sleeve 5 as the lateral portion of the projecting lock portion 13 abuts to one side of the protrusion 18.

Lock maintenance position display portions 20 and 21 are provided at recognizable positions of the main body 2 and the operation sleeve 5, respectively. The display portion 20 provided on the main body 2 is placed at a position corresponding to the engage recess 15 of the projecting lock portion 13, whereas the display portion 21 provided on the operation sleeve 5 is placed at a position corresponding to the lock maintenance projecting portion 18 provided on the inner circumferential surface of the large inner diameter portion 11.

On the outer circumference of the distal end of the main body 2, a dust cover ring 22 is provided to fit the front end portion of the operation sleeve 5 which is fitted to the outer circumference of the main body 2, so that the distal end of the operation sleeve 5 does not come out of the cover ring 22 even if the operation sleeve 5 moves backwards. The cover ring 22 also serves to prevent the operation sleeve 5 from dropping out of the socket.

The end portion side of an adapter 23 is screwed into the inner portion of the proximal end of the main body 2. In a cylindrical portion consisting of the main body 2 and the adapter 23, a valve body 24 is built in to be movable in the forward and backward directions. The valve body 24 is urged in the forward direction by a spring supported by the adapter 23. On the inner circumference of the cylindrical portion consisting of the main body 2 and the adapter 23, a valve seat 26 to which the valve main body 24 abuts and an O-ring 27 for sealing the gap between the inner surfaces of the adapter 23 and the main body 2 and the outer surface of the plug 9 to be inserted thereinto, are supported. Onto the outer circumference of the proximal end side of the adapter 23, a nut 28 used for mounting a hose is screwed.

Next, the locking operation of the operation sleeve 5, carried out when the pipe coupling socket 1 and the plug 9 are connected to each other, will now be described with reference to operation explanatory illustrations shown in FIGS. 8 to 12, in addition to FIGS. 1 to 7 which illustrate the rock releasing operation and the like.

First, in order to connect the pipe coupling socket 1 and the plug 9 to each other, the plug 9 is inserted to the main body 2 from the state shown in FIG. 1. In this manner, the lock member 4 equipped in the main body 2 engages with the engage groove 10 of the plug 9, and the lock members 4 are pressed in the centripetal direction by the lock member press portion 6 of the operation sleeve 5 situated at the forwarding position. Thus, the pipe coupling socket 1 and the plug 9 are connected to each other.

After the connection, in order to lock the operation sleeve 5 not to move backwards, the operation sleeve 5 is rotated in the circumferential direction so that the projecting lock portion 13 provided on the outer circumferential surface of the middle outer diameter portion 2b of the main body 2 and the lock releasing recess 16 provided on the inner circumferential surface of the small inner diameter portion 11 of the operation sleeve 5 do not match in position. Thus, even if it is attempted to move the operation sleeve 5 backwards, the stepped portion 14 on the large inner diameter hole portion side of the small inner diameter hole portion 11 formed in the inner circumferential surface of the operation sleeve 5 abuts to the distal end of the projecting lock portion 13 and thus further backward movement of the sleeve is inhibited. However, in the case where the operation sleeve 5 is furthermore rotated, the protrusion 18 provided on the large inner diameter hole portion 12 of the operation sleeve 5 abuts to the side of the projecting lock portion 13. Here, when a strong force is applied to the operation sleeve 5 in the rotating direction, the operation sleeve 5 is deformed in the outer diameter direction, and the protrusion 18 goes over the projecting lock portion 13 and then engages with the engage recess 15 provided in the projecting lock portion 13. In this manner, the rotation of the operation sleeve 5 is regulated so that it cannot rotate easily, and thus the operation sleeve 5 is locked and maintained in the lock state (see FIGS. 8 and 11).

The lock state can be confirmed by sensing while operating the operation sleeve 5 that the protrusion 18 direction, the operation sleeve 5 is deformed in the outer diameter direction, and the protrusion 17 goes over the projecting lock portion 13 and then engages with the engage recess 15 provided in the projecting lock portion 13. While the user carries out the above operation, he or she can sense the engagement and therefore can confirm that the lock releasing recess 16 and the projecting lock portion 13 match in position. In this manner, the rotation of the operation sleeve 5 is regulated so that it cannot rotate easily. Further, the lock of the operation sleeve 5 is released, that is, the sleeve 5 is maintained the state in which it can be moved backwards (see FIGS. 9 and 12).

Figure 10:
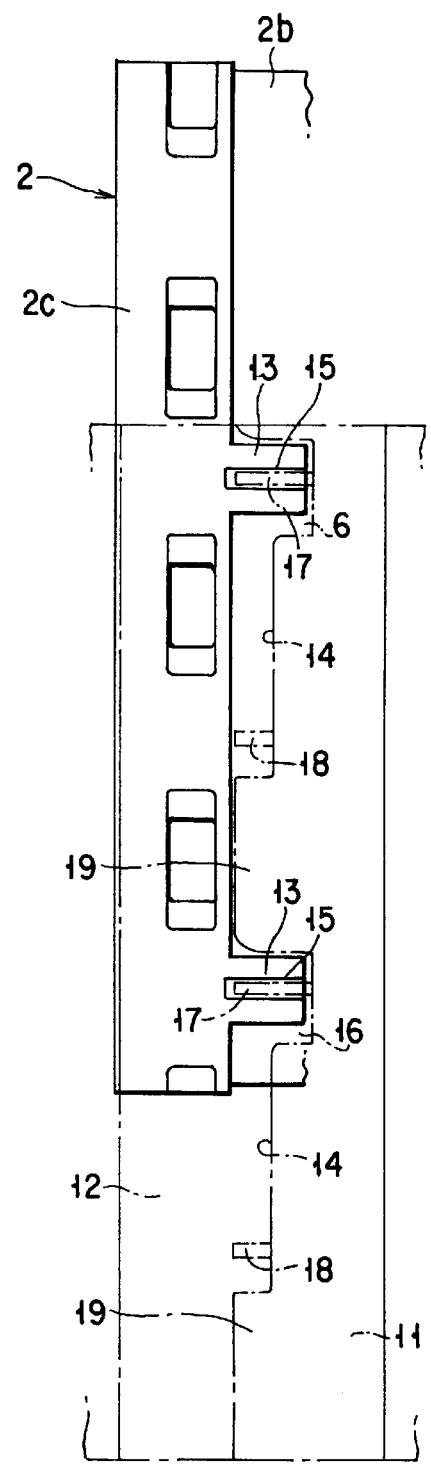
FIG. 10 is a development explanatory view of the main body and the operation sleeve of the pipe coupling socket, illustrating the state in which the operation sleeve is set back.
Figure 11:
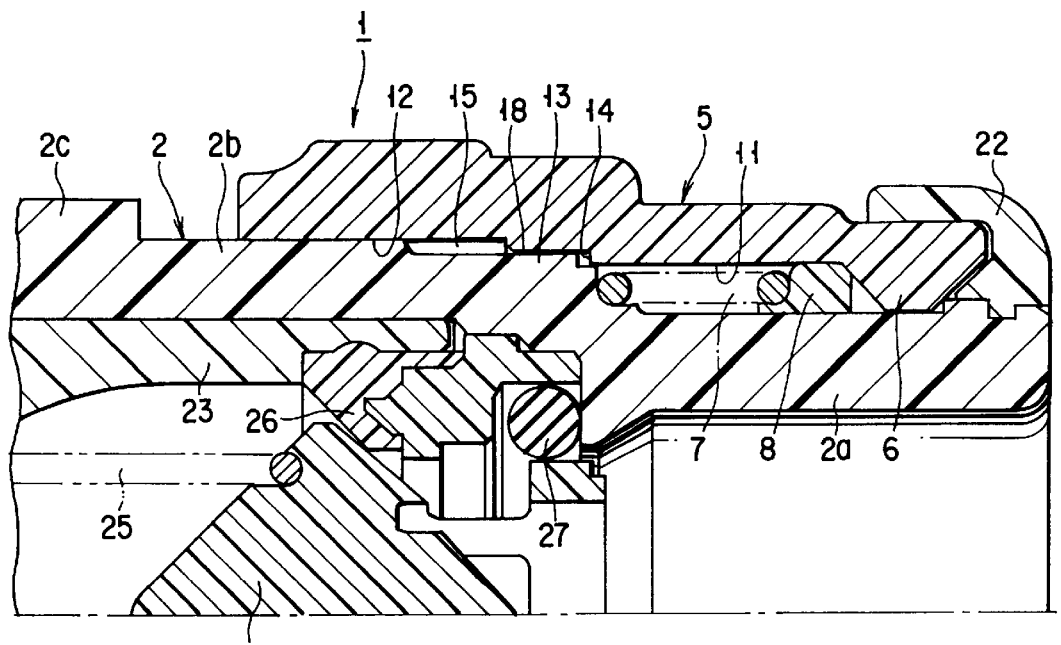
FIG. 11 is a longitudinal section of the main portion of the operation sleeve of the pipe coupling socket, illustrating the state of the maintenance of the lock.
Figure 12:
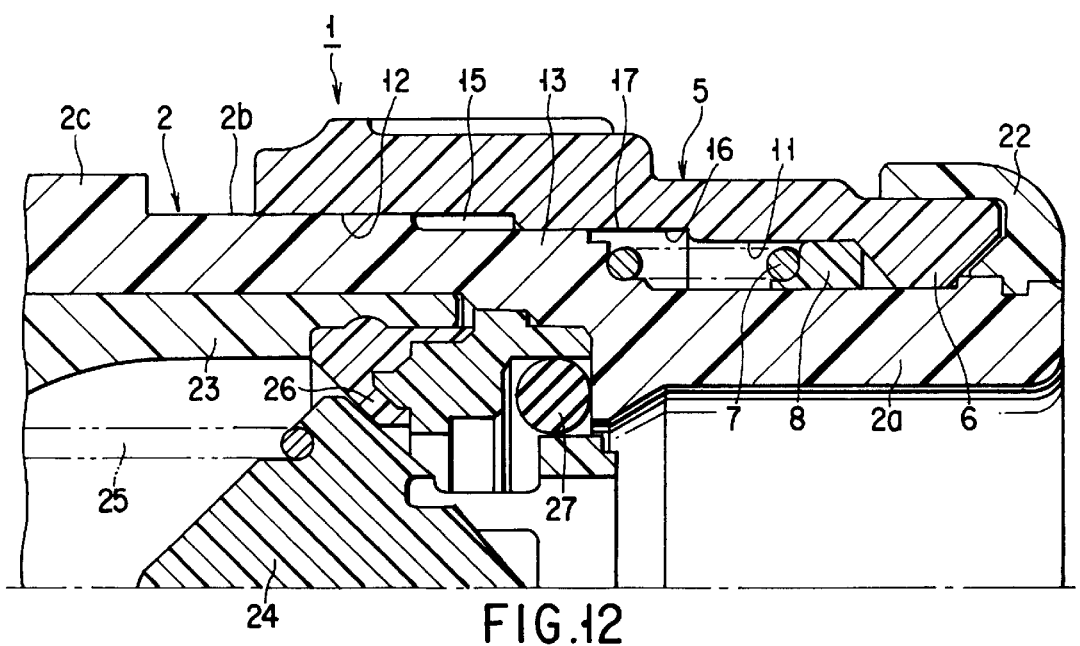
FIG. 12 is a longitudinal section of the main portion of the operation sleeve of the pipe coupling socket, illustrating the state in which the lock is maintained.

When the operation sleeve 5 is drawn in the backward direction from the above state, the lock projecting portion 13 enters the lock releasing recess 16 and the operation sleeve 5 is moved backwards (FIG. 10). Therefore, the lock member 4 which has been locking the plug 9 is released from being pressed by the operation sleeve 5, and thus the pipe coupling socket 1 and the plug 9 can be separated from each other.

In addition to the above, while the pipe coupling socket 1 and the plug 9 being separated from each other, the operation sleeve 5 can be set in the lock state by rotating the operation sleeve 5 in the circumferential direction and connecting the plug 9 to the pipe goes over the projecting lock portion 13 and engages with the groove or engage recess 15. Further, when the operation sleeve 5 is maintained in the lock state, the lock maintenance position display portion 20 provided to project from the outer circumferential surface of the main body 2 and the lock maintenance position display portion 21 provided on the operation sleeve 5 are located at positions which match with each other, and the matching can be confirmed by eye. It should be noted that the lock maintenance position display portion 21 is formed to be shorter than a plurality of protrusions formed on the outer circumference.

Next, in order to release the lock of the operation sleeve 5 not to move backwards so that the pipe coupling socket 1 and the plug 9 can be separated from each other, the operation sleeve 5 is rotated in the opposite direction to the above, so that the lock releasing recess 16 provided on the inner circumferential surface of the small inner diameter portion 11 of the operation sleeve 5 and the projecting lock portion 13 provided on the outer circumferential surface of the middle outer diameter portion 2b of the main body 2 match in position. Here, in the middle of the rotation of the operation sleeve 5, the protrusion 17 provided in the lock releasing recess 16 abuts the side of the projecting lock portion 13. Then, when a strong force is applied to the operation sleeve 5 in the rotating coupling socket 1 which is in the state that the operation sleeve 5 is locked not to move backwards.

As described above, in the pipe coupling socket 1 of the present invention, the structural elements of the lock means which locks the operation sleeve 5 not to move backwards, are set on the outer circumferential surface of the main body 2 and on the inner circumferential surface of the operation sleeve 5. With this structure, it is possible to lock the operation sleeve 5 without increasing the number of parts of the device. Therefore, the cost of the pipe coupling socket 1 can be reduced to low as compared to conventional devices of similar types, and the operation of the socket is very easy.

Further, in the pipe coupling socket 1, the lock maintenance position display 20 and 21 are provided at recognizable positions of the main body 2 and the operation sleeve 5, respectively. More specifically, the display 20 is provided at a position corresponding to the engage recess 15 of the projecting lock portion 13 provided in the main body 2, and the display 21 is provided at a position corresponding to the lock maintaining projecting portion 18 provided on the large inner diameter hole portion 12 of the operation sleeve 5. Thus, the structural elements for the locking means are provided on the outer circumference of the main body 2 and the inner circumference of the operation sleeve 5. With this structure, even if these elements are hidden by the operation sleeve 5, the lock maintaining positions can be known by checking the lock maintenance position display portions 20 and 21. Therefore, the lock maintenance operation can be easily carried out by matching the lock maintenance position display portions 20 and 21 with each other in position in the circumferential direction.

Further, in the pipe coupling socket 1 of the present invention, a cover ring 22 is provided on the distal end of the main body 2 such that the front end portion of the operation sleeve 5 is held on to the distal end of the main body 2 as it is fitted into the cover ring 22. With this cover ring 22, the distal end of the operation sleeve 5 can be protected and further, it is possible to avoid the entering of dusts to the device. Without the cover ring 22, the distal end of the operation sleeve 5 may hit some other member and be damaged. Further, dust or the like may enter between the operation sleeve 5 and the main body 2, to make difficult for the operation sleeve 5 to move. These undesired drawbacks can be prevented by the present invention.

The embodiment described above has a structure in which the projecting lock portion 13 is provided on the outer circumferential surface of the middle outer diameter portion 2b of the main body 2, the lock releasing recess 16 is provided on the inner circumferential surface of the small inner diameter portion 11 of the operation sleeve 5, and the protrusion 18 is provided on the inner circumferential surface of the large inner diameter hole portion 12. As an alternative embodiment, it is possible to have a structure in which the projecting lock portion 13 is provided on the outer circumferential surface of the large inner diameter portion 12 of the operation sleeve 5, the lock releasing recess 16 is provided on the outer circumferential surface of the large outer diameter portion 2c of the main body 2, and the protrusion 18 is provided on the outer circumferential surface of the middle outer diameter portion 2b.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A pipe coupling socket including:

a hollow cylindrical main body having a front end portion capable of receiving a male member in which a groove is formed in an outer circumferential portion thereof, and a rear end portion to which a pipe member to be connected to the male member, can be fixed;

a plurality of radial holes formed in an front end portion of the main body in the circumferential direction at equal intervals, each hole having such a shape that the inner circumferential diameter reduces towards a center of the front end portion;

a plurality of locking members received in said plurality of radial holes to be movable, each lock member engaging with a groove formed in an outer circumferential surface of the male member as each lock member moves inwards in the radial direction, thereby stopping movement of the male member in the axial direction;

an operation sleeve mounted to be slidable, onto the front end portion of the main body, and serving to stop the lock members from moving outwards in the radial direction when the operation sleeve moves to the front end side, and to enable the movement of the lock member when the operation sleeve moves to a rear end side;

a projecting lock portion having a predetermined width and a length in the axial direction, and a top surface having a groove formed therein, and projecting from one side of the outer circumferential surface of the main body and the inner circumferential surface of the operation sleeve;

a step portion formed in another side of the outer circumferential surface of the main body and the inner circumferential surface of the operation sleeve, such as to engage with an axial directional end of the projecting lock portion, thus inhibiting the operation sleeve from transferring to the rear end portion side;

a lock releasing recess recessed in the step portion such as to receive the axial directional end of the projecting lock portion, thus allowing the operation sleeve to transfer to the rear end portion side; and protruding portions each to be fitted to the groove to prevent the operation sleeve from transferring in the circumferential direction, when the projecting lock portion is placed at a position which matches the lock releasing recess in the axial direction, and at a position which is offset from the lock releasing recess in the circumferential direction;

the projecting lock portion being able to go over the protruding portion when the operation sleeve is moved by a user in the circumferential direction.

2. A pipe coupling socket according to claim 1, wherein:

the main body has a small outer diameter portion, a middle outer diameter portion and a large outer diameter portion arranged in the order from an front end portion to are rear end portion;

the operation sleeve has a large inner diameter portion slidable on the large outer diameter portion and a small inner diameter portion movable on the middle outer diameter portion; and the projecting lock portion is formed on the outer circumferential surface of the middle outer diameter portion of the main body, and the lock releasing recess is formed in the small inner diameter portion of the operation sleeve.

3. A pipe coupling socket according to claim 1, wherein:

a pair of the projecting lock portion and the lock releasing recess are formed to face in the radial direction.

4. A pipe coupling socket according to claim 1, further comprising:

a regulation step portion protruding in the axial direction from the step portion between the lock releasing recess and the protruding portion formed at a position which is offset in the circumferential direction from the lock releasing recess, the regulation step portion being able to be engaged with one of the side edge portions of the projecting lock portion when the groove of the projecting lock portion fits with any one of the protruding portions.

5. A pipe coupling socket according to claim 1, wherein a pair of the regulation step portions are formed to face in the radial direction.

6. A pipe coupling socket according to claim 1, further comprising a display portion provided for at least one of the main body of the socket and the operation sleeve such as to be visually recognizable from outside, for displaying either one of the state in which the operation sleeve can move to the rear end portion side, and the state in which it cannot move.

7. A pipe coupling socket according to claim 1, wherein a display portion includes a display formed on an outer surface of the main body at a position where it matches the groove in the axial direction, and another display formed on an outer surface of the operation sleeve at a position where it matches the protruding portion in the axial direction, to which the projecting lock portion fits at the position which is offset from the lock releasing recess in the circumferential direction.

8. A pipe coupling socket according to claim 1, further comprising a cover ring mounted to the front end portion of the main body, such as to be capable of receiving the front end portion of the operation sleeve.

9. A pipe coupling socket according to claim 1, further comprising an adapter which can be mounted to a rear end portion of the socket body, a valve seat held in the main body, and a valve body urged towards the valve seat.

* * * * *